United States Patent
Mauchly

(10) Patent No.: US 8,446,450 B2
(45) Date of Patent: May 21, 2013

(54) METHOD OF LIGHTING

(75) Inventor: J. William Mauchly, Berwyn, PA (US)

(73) Assignee: Cisco Technology, Inc., San Jose, CA (US)

( * ) Notice: Subject to any disclaimer, the term of this patent is extended or adjusted under 35 U.S.C. 154(b) by 1210 days.

(21) Appl. No.: 12/112,037

(22) Filed: Apr. 30, 2008

(65) Prior Publication Data

US 2009/0273661 A1 Nov. 5, 2009

(51) Int. Cl.
*H04N 7/14* (2006.01)
*G09G 3/36* (2006.01)

(52) U.S. Cl.
USPC ........................................ 348/14.01; 346/102

(58) Field of Classification Search
USPC . 348/14.01–14.16, 370, 371, 376; 455/412.2; 345/102–104
See application file for complete search history.

(56) References Cited

U.S. PATENT DOCUMENTS

| 6,222,520 B1* | 4/2001 | Gerszberg et al. ............ 715/784 |
| 2005/0046739 A1* | 3/2005 | Voss et al. ..................... 348/371 |
| 2008/0068444 A1* | 3/2008 | Thielman et al. ............ 348/14.1 |
| 2008/0119170 A1* | 5/2008 | Montebovi et al. ........ 455/412.2 |

FOREIGN PATENT DOCUMENTS

| EP | 1551178 A1 * | 7/2005 |
| WO | WO 2008072152 A1 * | 6/2008 |

* cited by examiner

*Primary Examiner* — Curtis Kuntz
*Assistant Examiner* — Sunita Joshi
(74) *Attorney, Agent, or Firm* — Patent Capital Group

(57) ABSTRACT

In one embodiment, a method of lighting is disclosed which includes apportioning a video display screen into a content portion and at least one light portion. The content portion displays video content and the light portion provides auxiliary lighting when energized to illuminate a subject adjacent the video display screen.

19 Claims, 7 Drawing Sheets

METHOD OF LIGHTING

TECHNICAL FIELD OF THE INVENTION

The present disclosure relates generally to a method of lighting a subject adjacent a video display screen.

BACKGROUND

Video conferencing has become a useful and often used method of communication between remote parties. Good lighting is generally necessary for good quality video capture during video conferencing. One of the sources of illumination of the parties taking part in the video conference is the lighting from the video display screen adjacent which the party is seated. Another source being ambient light.

U.S. Pat. No. 5,142,562 teaches a sound and vision communications terminal for use in video conferencing. The sound and vision communications terminal includes a display screen, camera and separate auxiliary lighting device. The auxiliary lighting device is controlled, either by the user or by a sensor, to suitably illuminate the user of the terminal during video conferencing.

OVERVIEW

Any reference herein to a lighting level must be interpreted sufficiently broadly to include at least a color level and/or a luminescence level.

In one form the invention resides in a method comprising:
apportioning a video display screen into a content portion which displays video content and at least one light portion which provides auxiliary lighting when energized to illuminate a subject adjacent the video display screen.

In another form, the invention resides in an apparatus comprising a video signal composer which composes a video signal containing video content to be transmitted to a video display screen to be received and displayed thereby and including a logic controller which is operable to control the composition of the video signal so that when the video signal is received and displayed by the video display screen, the video display screen is apportioned into a content portion which displays the video content and at least one light portion which provides auxiliary lighting when energized to illuminate a subject adjacent the video display screen.

DESCRIPTION OF EXAMPLE EMBODIMENTS

Figure 1:
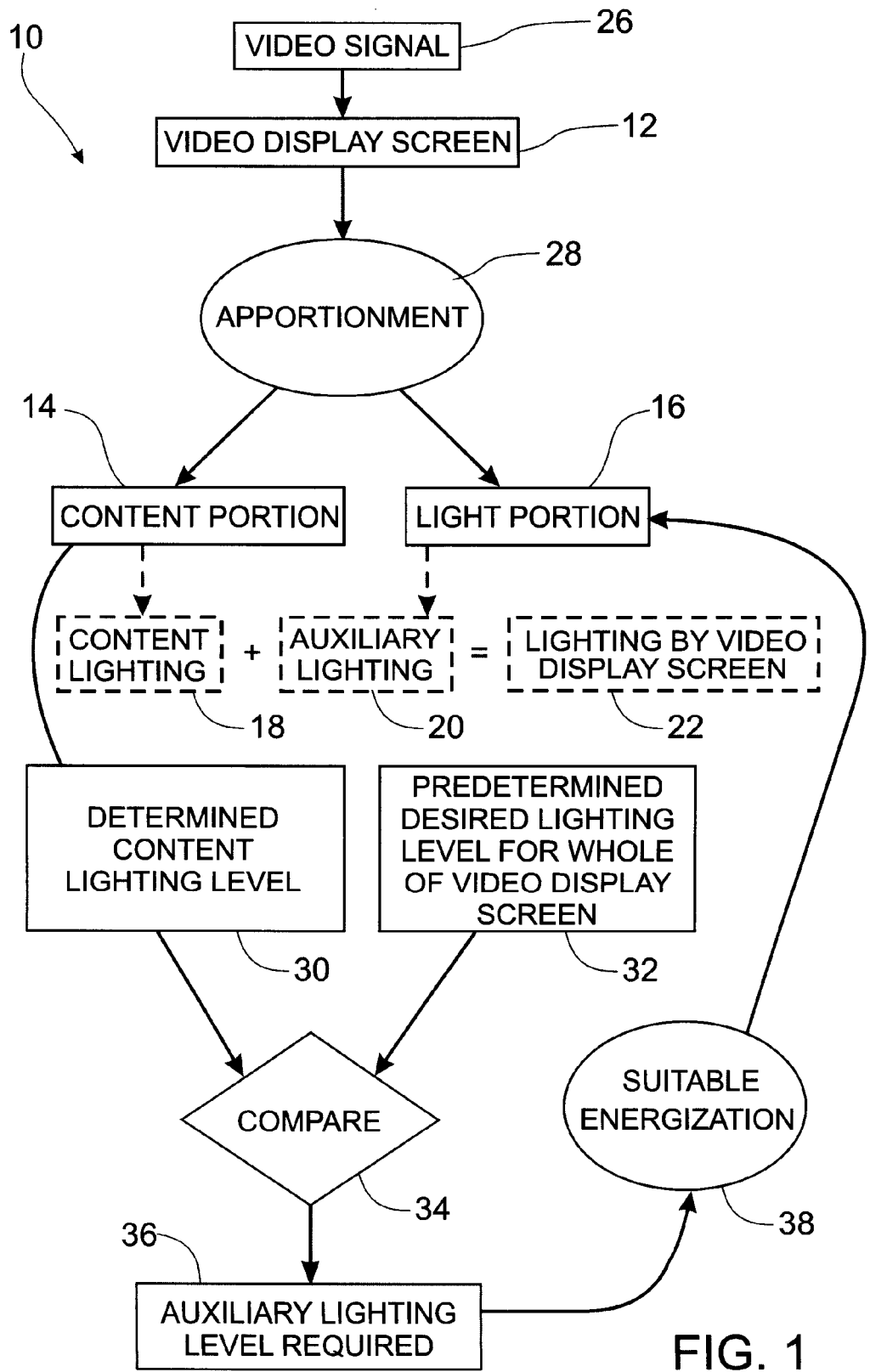
FIG. 1 illustrates an example display method for a video display screen.

The present invention will now be described with reference to the drawings, wherein like reference numerals are used to refer to like elements throughout.

Figure 2:
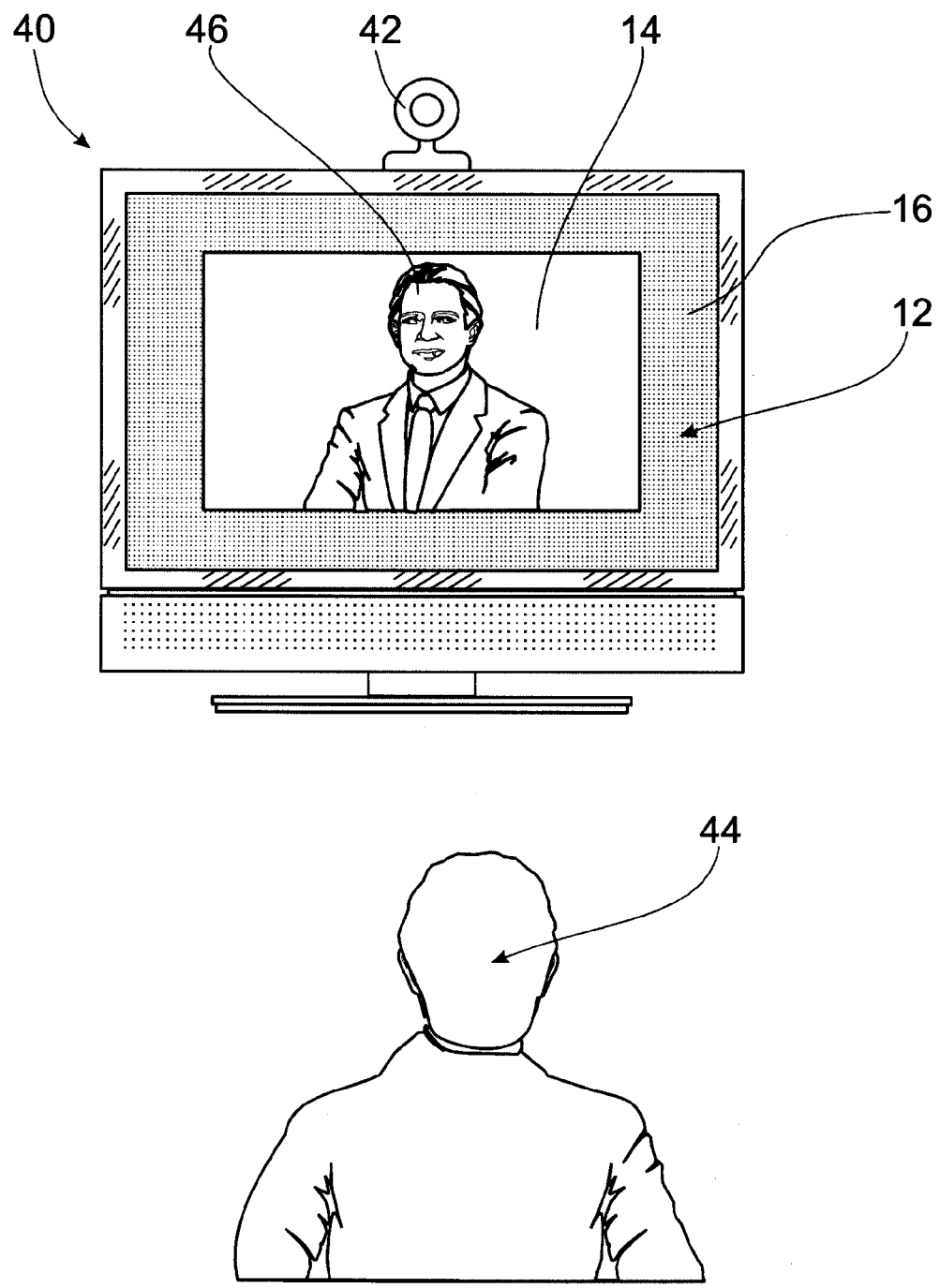
FIG. 2 illustrates a perspective view of an example video display screen used in video conferencing, incorporating the display method.

With reference to FIG. 1 of the drawings, a display method in accordance with one embodiment of the invention is designated generally by reference numeral 10. In the display method 10 a video display screen 12 is apportioned 28 into a content portion 14 and a light portion 16. The content portion 14 displays video content which creates content lighting 18 adjacent the display screen 12. The light portion 16 creates auxiliary lighting 20 when energized. The video display screen 12 has a number of pixels which cover the whole of the screen 12. The pixels each emit combinations of color at differing intensity levels depending on how their sub-pixel color components are energized. The sub-pixels would generally be red, green and blue sub-pixels but may also be cyan, magenta and yellow sub-pixels or any other suitable color combination. The content lighting 18 and auxiliary lighting 20 together provides lighting 22 to illuminate a person 44 sitting adjacent the display screen 12 during video conferencing (as seen in FIG. 2). The lighting 22, together with ambient light, provides required suitable lighting of the person 44.

The video display screen 12 receives a video signal 26. The video signal 26 is composed in a manner which will be described in more detail herein below with reference to FIG. 5, so that the video display screen 12 is apportioned as indicted by reference numeral 28.

The level of content lighting 18 provided by the content portion 14 may be indirectly determined by assessing the intensity values of the sub-pixels of the pixels in the content portion 14 of the video display screen 10, as indicated by reference numeral 30. In one method of determining the intensity values a summated intensity value for each color category, for example red, green and blue, of sub-pixels of the content portion 14 is obtained. The summated intensity value for each color category is the sum of the intensity values for each sub-pixel of that color category. The summated intensity values are proportional to the actual content lighting 18 provided by the content portion 14 and thus indicative of the color and luminescence of the content lighting 18.

Other methods of determining the level of content lighting may include dot product, weighted sum or like mathematical methods.

A predetermined desired lighting level to be provided by the video display screen is indicated by reference numeral 32. The predetermined desired lighting level 32 may be a fixed value determined at initial setup by calibration as will be described in more detail with reference to FIG. 5. Alternatively it may be a user controllable value. The predetermined desired lighting level 32 may, for example, be given as intensity values for each color category of the sub-pixels of the video display screen 12. The intensity values may also, for example, be presented as hue, saturation, lightness (HSL), or hue, saturation, value (HSV) transforms of the red, green, blue color space. The determined content lighting level 30 is compared with the predetermined desired lighting level 32 in a step indicated by reference numeral 34. The difference in intensity values between the determined content lighting level 30 and the desired lighting level 32 is the auxiliary lighting level required as indicated by reference numeral 36. The auxiliary lighting level required 36 is once again given as intensity values for each color category of the sub-pixels in the light portion.

The light portion 16 is suitably energized to the intensity values of the auxiliary lighting level 36, as indicted by reference numeral 38. The light portion 16 is energized to provide auxiliary lighting 20.

The auxiliary lighting 20 is of such a color and luminescence to complement the color and luminescence of the content lighting 18 so that the lighting 22 by the whole video display screen 12 is suitable for illuminating the person 44 sitting adjacent the display screen 12. This is achieved by energizing the sub-pixels of the light portion 16 to the intensity values resulting from the comparison 34 discussed hereinabove. It should be appreciated that the color and intensity of the auxiliary lighting 20 can be changed dynamically as the color and intensity of the content lighting changes, thereby to keep the lighting 22 as close as possible to the required suitable lighting for illumination of the person 44.

It will be appreciated that the lighting 22 by the video display screen is a function of the predetermined desired lighting level 32 for the whole of the video display screen. As such, the predetermined desired lighting level 32 is set so that the lighting by the video display screen 22, together with ambient light, optimally lights the person 44. An example of setting the predetermined desired lighting level 32 is discussed in more detail with reference to FIG. 7 of the drawings.

Figure 3:
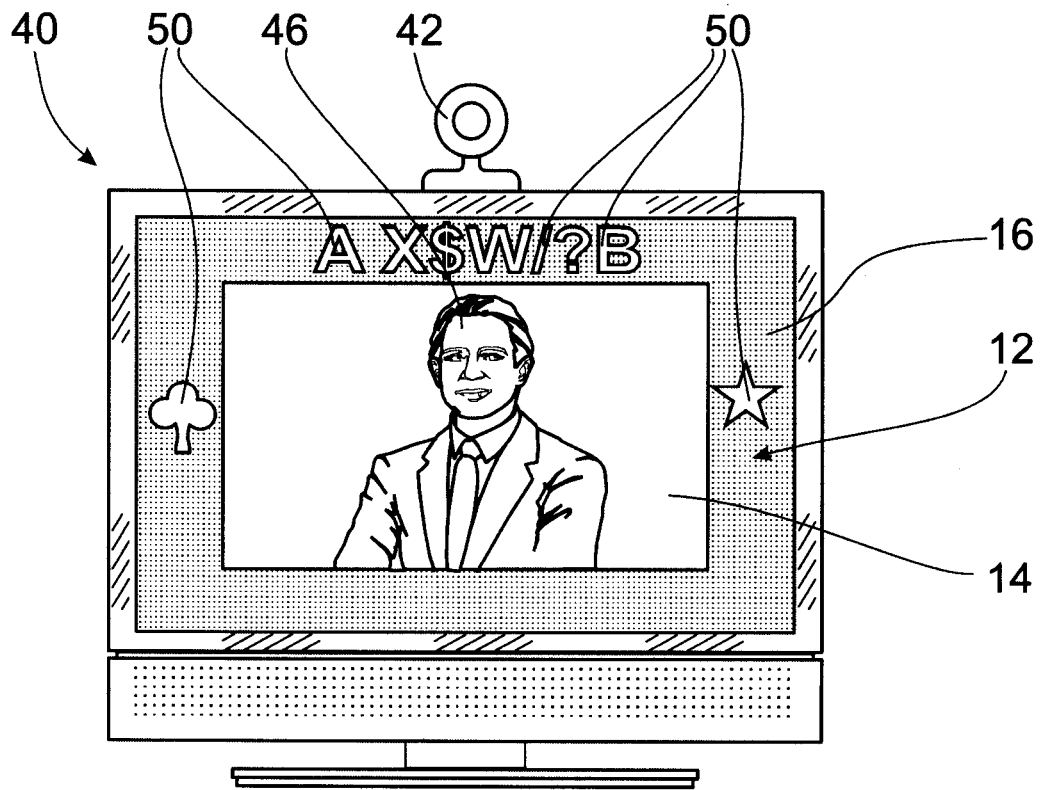
FIG. 3 illustrates a perspective view of further example video display screen used in video conferencing, incorporating the display method.
Figure 3:
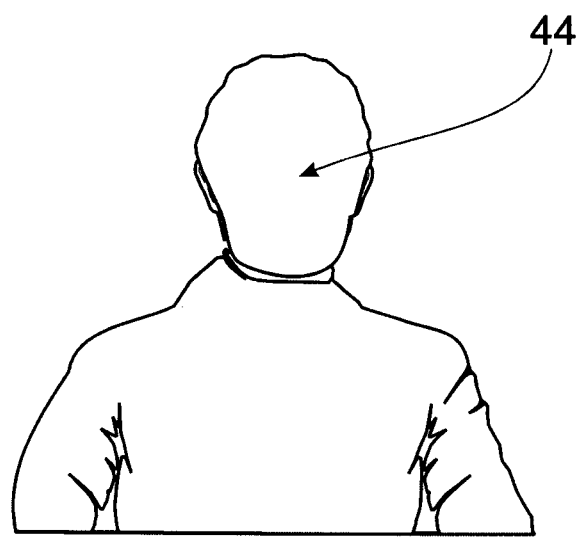
Figure 4:
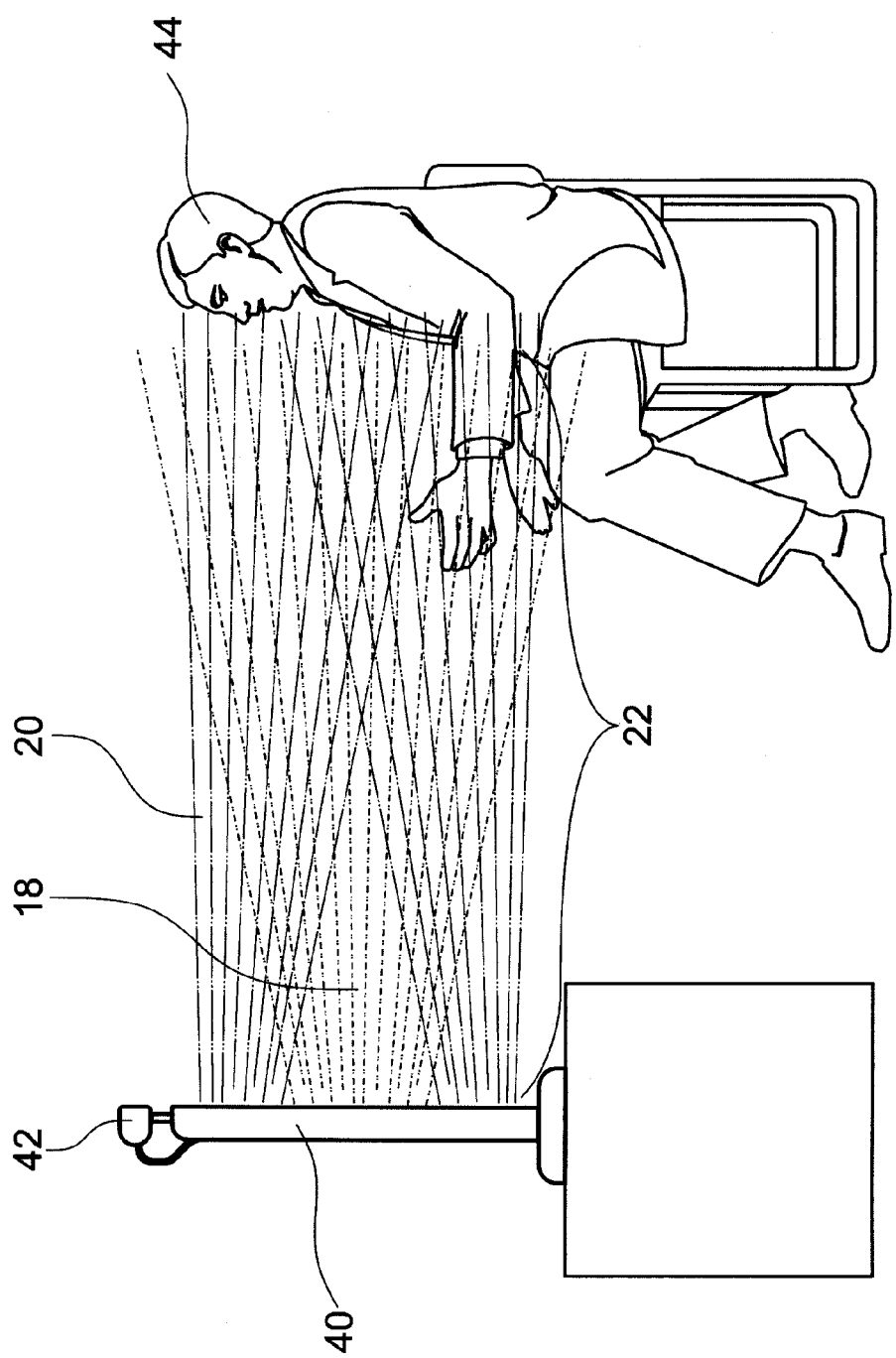
FIG. 4 illustrates a side view of an example video display screen used in video conferencing, incorporating the display method.

With reference to FIGS. 2 to 4 of the drawings, in one embodiment of the invention, the video display screen 12 forms part of a video display in the form of a (liquid crystal display) LCD television 40. A video camera in the form of a webcam 42 (or other suitable digital video camera) is mounted on top of the television 40.

In one preferred embodiment, the video display screen 12 is apportioned into the content portion 14 and the light portion 16. The content portion 14 is rectangular and positioned centrally in the video display screen 12. The light portion 16 borders the content portion 14 and surrounds it. Other arrangements such as the light portion to only one side or above or below the content portion may also be suitable in some applications.

In the drawings, a video conference between a first subject in the form of the person 44 and a second person 46 is being conducted. The video image of the second person 46 is displayed on the content portion 14 of the video display screen 12. The webcam 42 is aimed at the first person 44 to capture video of him, which is then transmitted to the display screen of the second person 46. Similarly, a webcam is also aimed at the second person 46, which video image is displayed on the video display screen 12. The first person 44 is seated adjacent the video display screen 12 so that he/she is at least partially illuminated by lighting 22 from the video display screen 12. The lighting 22 comprises the content lighting 18 from the content portion 14 of the video display screen 12 and the auxiliary lighting 20 from the light portion 16 of the video display screen 12. The predetermined desired lighting level 32 is set for suitable illumination of the person 44 by the lighting 22 together with ambient light.

Referring specifically to FIG. 3 of the drawings, in another embodiment of the invention secondary content 50 may be displayed by the light portion 16 of the video display screen. The secondary content 50 may, for example, be advertising. During display of the secondary content 50, the auxiliary lighting 20 as provided by the light portion 16 is kept at the required auxiliary lighting level 36. This is to say that the summated intensity values for each category, for example red, green and blue, of sub-pixels of the light portion 14 is kept as required even though the individual intensity values for sub-pixels of some pixels are varied.

Figure 5:
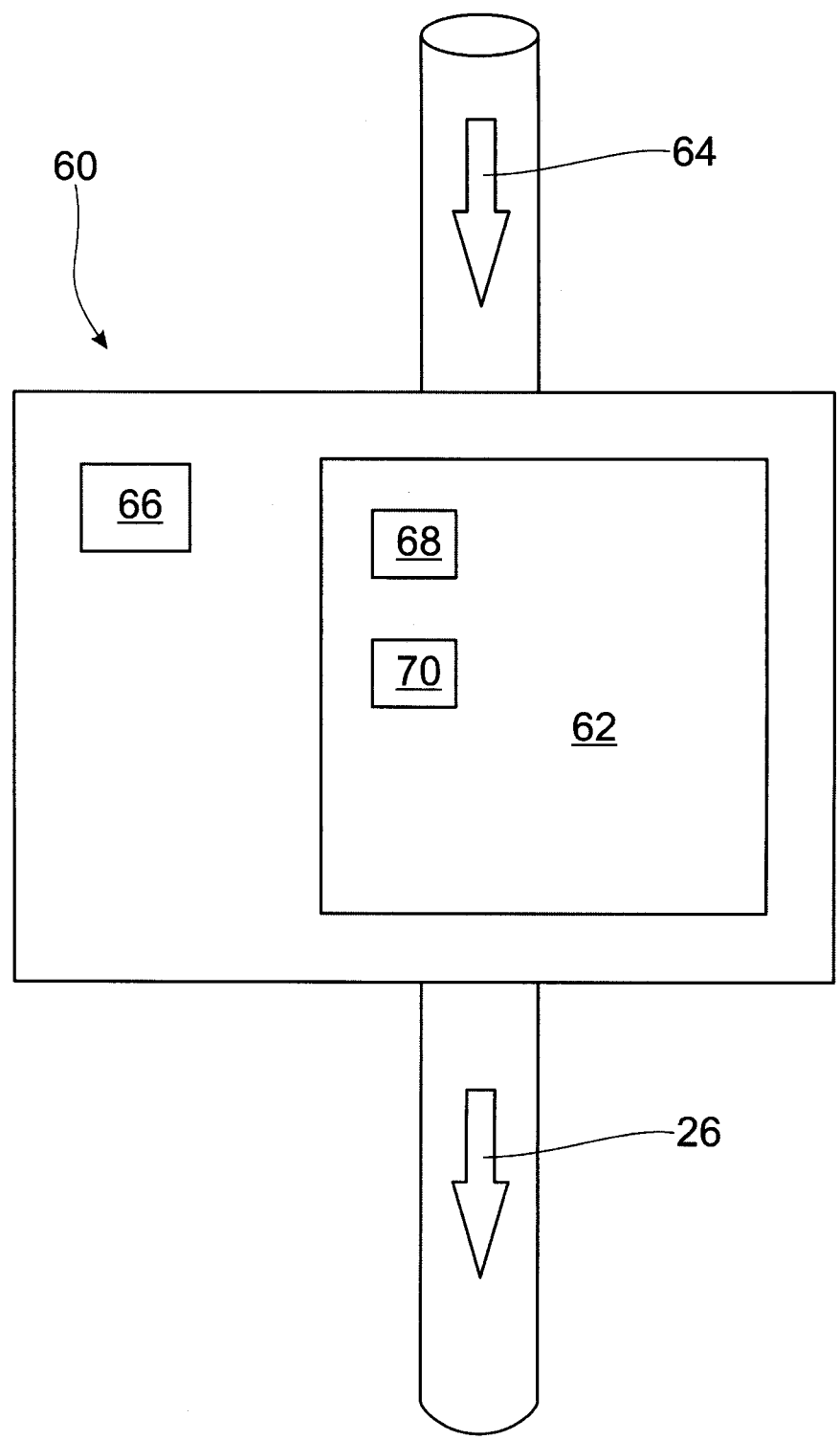
FIG. 5 illustrates an example apparatus for video signal composition of a video signal for the video display screen.

With reference to FIG. 5 of the drawings, a video signal composer in accordance with an embodiment of the invention is designated generally by reference numeral 60. The video signal composer 60 includes a memory 66 and a logic controller 62 including a comparator 68 and a logic chip 70. The video signal composer 60 receives an incoming video signal 64 and then composes an outgoing video signal 26 which includes the incoming video signal 64. The incoming video signal 64 comprises the video content to be displayed on the content portion 14. During the video conference, the incoming video signal 64 will be the video signal generated by the webcam at the side of the second person 46. The outgoing video signal 26 is the signal received by the television 40 to be displayed on the display screen 12. Predetermined desired intensity values for the predetermined desired lighting level 32 is stored in the memory 66. The outgoing video signal 26 includes a video content part which is similar to the incoming video signal 64 and a lighting part to be displayed by the light portion 16. The logic controller 62 composes the outgoing video signal 26 by:

calculating the intensity values for each color category of sub-pixels as will be displayed by the content portion 14 of the video display screen 12 with the logic chip 70;

comparing the calculated intensity values with the intensity values stored in the memory 66, using the comparator 68 to determine an auxiliary lighting level required 36; and adjusting the signal 26 so that the intensity values for the sub-pixels of the light portion 16 of the video display screen is energized so that it will produce auxiliary lighting at the level required 36. By adjusting the signal 26 so that the light portion 16 is energized to the auxiliary lighting level required 36, the auxiliary lighting 20 is supplemental to that which is produced by the content portion 14 of the video display screen to achieve suitable illumination of the person 44.

In yet another embodiment of the invention, the webcam 42 is connected to the logic controller and one or a combination of the exposure, white balance and automatic gain control of the webcam 42 is adjusted in response to the video signal 26 composed by the video signal composer 60. As the logic controller 62 determines the intensity of the color components off all the pixels and thus of the lighting 22 by the video display screen, this is used by the webcam 42 as an input to pro-actively adjust exposure, white balance and automatic gain control of the webcam 42.

Figure 6:
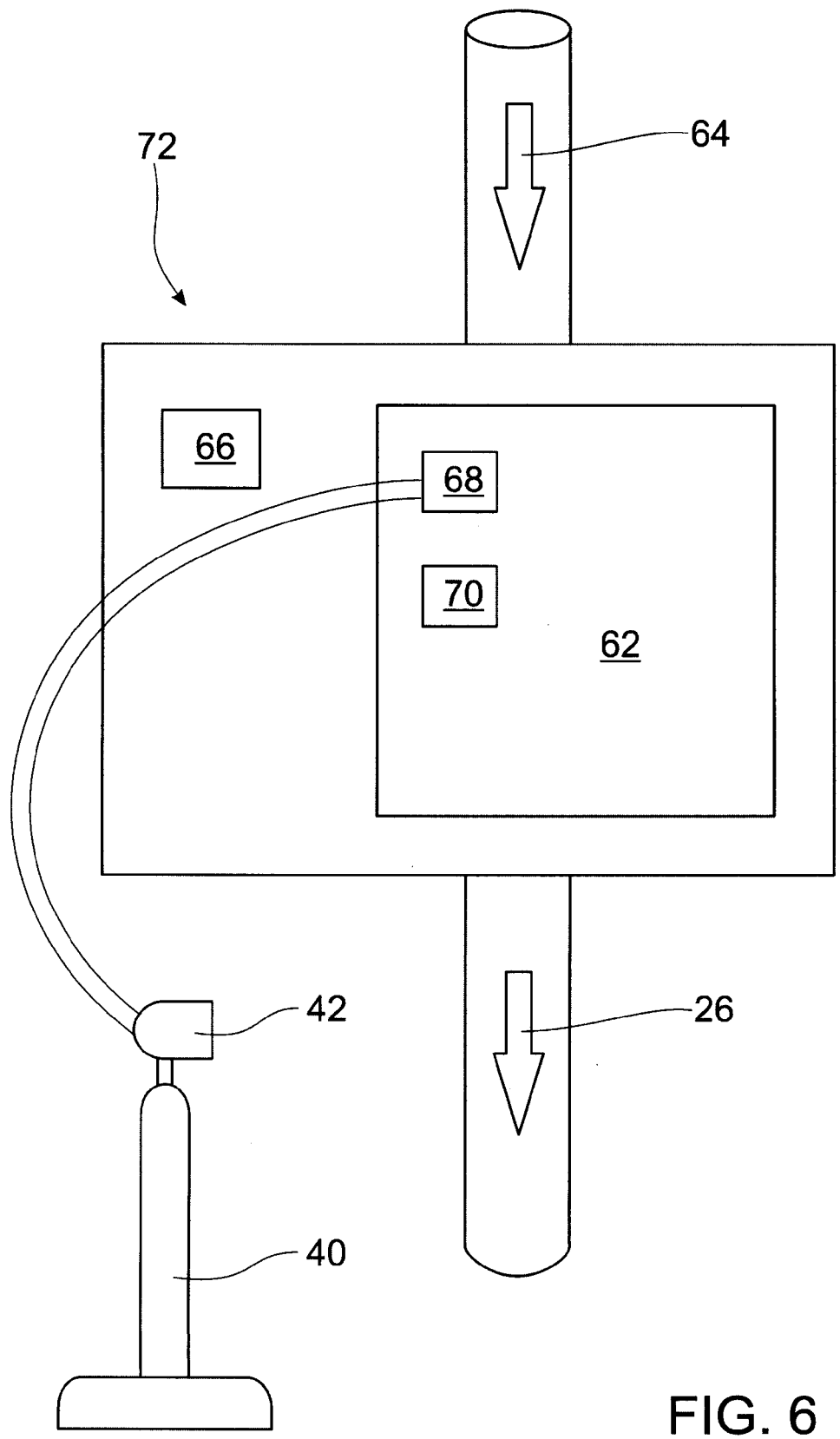
FIG. 6 illustrates another embodiment of an example apparatus for video signal composition of a video signal for the video display screen.
Figure 7:
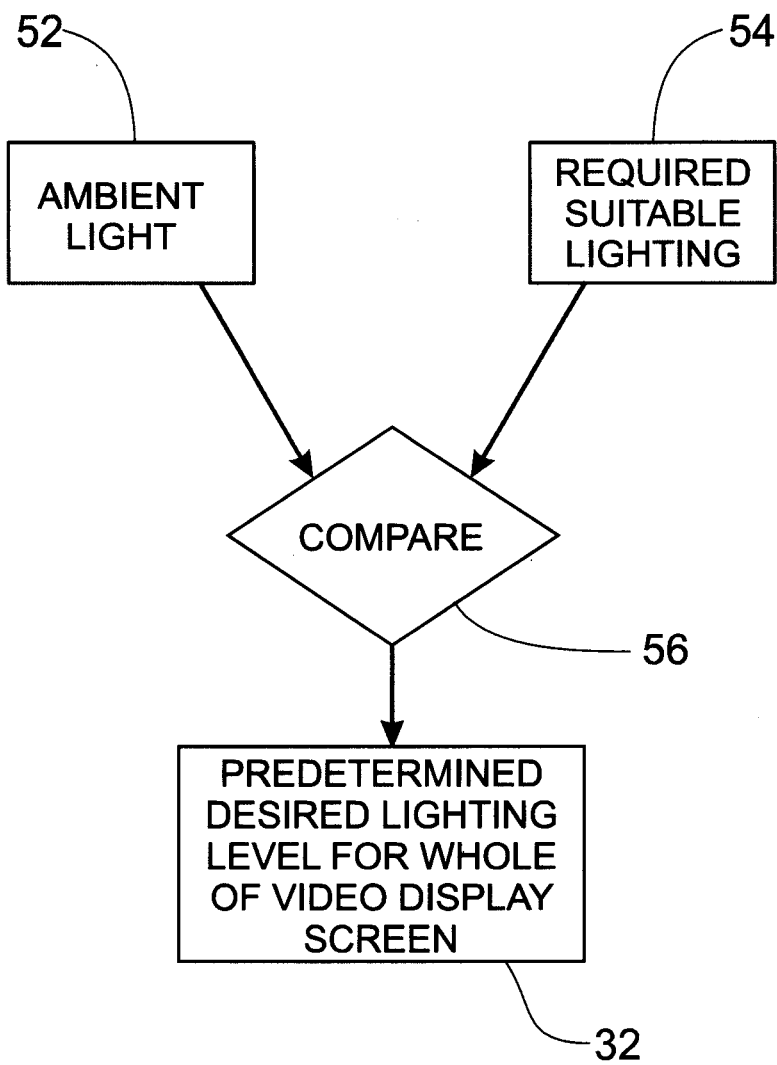
FIG. 7 illustrates an example calibration method for use in the display method.

With reference to FIGS. 6 and 7 of the drawings, another embodiment of a video signal composer for implementing a method in accordance with the invention, is designated generally by reference numeral 72. The video signal composer 72 is similar to the video signal composer 60, with the only difference being that the video signal composer 72 is connected to the webcam 42. In the video signal composer 72 the lighting 22 by the video display screen 12, together with ambient light, is measured as a lighting level by the webcam 42. The lighting level is compared to a required suitable lighting level 54 which is stored in the memory 66. The lighting level as measured by the webcam 42 is compared to the required suitable lighting level 564 using the comparator 68. The difference between the two lighting levels is interpreted by the logic chip 70 which is operable to calculate intensity values for the color categories of the sub-pixels in the light portion 14 to bring the measured lighting as close as possible to the required suitable lighting 54. The logic controller 62 adjusts the signal 26 so that the intensity values for the sub-pixels of the light portion 16 of the video display screen are kept at that which is calculated by the logic chip 70. It must be appreciated that a device other than the webcam 44 may be used to measure the lighting adjacent the video display screen and provide the lighting level input to the comparator. Such device may, for example, be a photodiode.

In one embodiment, the webcam 42 has automatic gain control which level is indicative of the lighting adjacent the video display screen 12. The automatic gain control multiplies the digital light levels form the webcam's camera sensor to bring them into a normalized range. This automatic gain control allows the webcam 42 to adjust to different amounts of light. Increased gain levels will increase the amount of noise in the picture. The gain control levels may be used as an input to the logic controller 62 to be indicative of the lighting adjacent the illumination display screen.

With reference to FIG. 7 of the drawings, in another embodiment, the video signal composer 72 is calibrated by measuring light adjacent the video display screen 12 with the webcam 42 when the video display screen 12 is blacked out in a test image condition. With the video display screen 12 blacked out, the webcam 42 measures ambient light 52. The logic controller 62 is then operable to determine the predetermined desired lighting level 32 to be provided by the video display screen 12 by comparing, with the comparator 68, the ambient light 52 with the required suitable lighting 54 for the person 44. The predetermined desired lighting level 32 is the difference between the required suitable lighting 54 and the ambient light 52. The required suitable lighting 54 may be preset or may be determined by the logic controller 62 to be as close to an optimum preset value as possible. The required suitable lighting may be a lighting level at which the automatic gain control of the webcam 42 will be within a specified range. To avoid noise in the pictures the automatic gain control of the webcam should be at as low a level as possible.

Calibration may further include whiting out the video display screen 12 in a test image condition so that the maximum amount of luminescence is provided by the video display screen 12. The webcam 42 is then able to measure the lighting level of the combination of ambient light 52 and maximum light which can be provided by the video display screen 12. By comparing this lighting level to that which is measured when the video display screen 12 is blacked out, a determination can be made by the logic controller 62 as to the maximum effect which the video display screen 12 can have on the illumination of the person 44. Using this and the ambient light 52 determination as inputs, the logic controller can interpolate to predetermine the desired lighting level 32 for the whole of the video display screen.

Suitable lighting of the person 44 adjacent the video display screen 12 is thus achieved during video conferencing without the need of external lighting. The quality of the video image recorded by the webcam 44 is enhanced as the webcam 44 records video in these closer to ideal lighting conditions.

The invention claimed is:

1. A method comprising:
apportioning a video display screen into a content portion which displays video content, wherein a content lighting level is provided by the content portion;
providing auxiliary lighting when at least one light portion is energized to illuminate a subject adjacent the video display screen, wherein the auxiliary lighting is provided as long as the video display screen displays the video content; and
calibrating, to a predetermined desired lighting level, the auxiliary lighting by measuring the content lighting level adjacent the video display screen with a video camera when the video display screen displays a predetermined test image and adjusting the auxiliary lighting until the predetermined desired lighting level is obtained.

2. The method of claim 1, which includes apportioning the video display screen in an arrangement wherein the content portion is bordered by the light portion.

3. The method of claim 1, which includes:
determining the content lighting level provided by the content portion of the video display screen;
comparing the content lighting level with the predetermined desired lighting level to be provided by the whole of the video display screen;
determining a required auxiliary lighting level which is the difference between the content lighting level and the desired lighting level; and
suitably energizing the light portion of the video display screen to provide the auxiliary lighting level.

4. The method of claim 3, which includes comparing the content lighting level with the predetermined desired lighting level as the video content changes and dynamically adjusting the energization of the light portion so as to strive for the continued desired lighting level.

5. The method of claim 3, which includes adjusting the color balance of the auxiliary lighting to produce the desired color balance for the desired lighting level.

6. The method of claim 3, which includes adjusting the luminescence of the auxiliary lighting to produce the desired luminescence for the desired lighting level.

7. The method of claim 3, which includes calculating intensity values for color components of the content portion of the video display screen as the content is displayed and comparing the calculated color component intensity values with predetermined desired color component intensity values for the whole of the video display screen and energizing color components of the light portion to produce a combination of color with intensity values which are supplemental to that which is produced by the content portion of the video display screen to achieve the predetermined desired lighting level for the whole of the video display screen.

8. The method of claim 3, which includes displaying secondary content on the light portion of the video display screen while keeping the auxiliary lighting level as required.

9. The method of claim 3, further comprising:
recording video of a subject adjacent the video display screen with a video camera; and
transmitting the video via a communications network.

10. The method of claim 9, which includes adjusting one of the exposure, the white balance or the automatic gain control of the video camera in response to change in the determined content lighting level and auxiliary lighting level.

11. An apparatus comprising:
a video signal composer which composes a video signal containing video content to be transmitted to a video display screen to be received and displayed thereby; and
logic controller which is operable to control the composition of the video signal so that when the video signal is received and displayed by the video display screen, the video display screen is apportioned into a content portion which displays the video content and at least one light portion which provides variable auxiliary lighting when energized to illuminate a subject adjacent the video display screen, wherein the variable auxiliary lighting is provided as long as the video display screen displays the video content.

12. The apparatus of claim 11, wherein the logic controller is operable to compose the video signal so that the video display screen is apportioned in an arrangement wherein the content portion is bordered by the light portion.

13. The apparatus of claim 11, wherein the logic controller is operable to control the composition of the video signal by:

determining a content lighting level which will be provided by the content portion of the video display screen when displayed;

comparing the content lighting level with a predetermined desired lighting level to be provided by the whole of the video display screen;

determining a required auxiliary lighting level which is the difference between the content lighting level and the desired lighting level; and composing the signal so that the video content is displayed by the content portion of the video display screen and the light portion of the video display screen is suitably energized to provide the auxiliary lighting level.

14. The apparatus of claim 13, wherein the logic controller is operable to compare the content lighting level with the predetermined desired lighting level as the video content changes and to dynamically adjust the composition of the signal so that the auxiliary lighting level is adjusted so that the whole of the display screen strives for the continued desired lighting level.

15. The apparatus of claim 13, wherein the logic controller is operable to adjust the video signal so that the color of the auxiliary lighting level will be such that the desired color for the desired lighting level is obtained.

16. The apparatus of claim 13, wherein the logic controller is operable to adjust the video signal so that the luminescence of the auxiliary lighting level will be such that the desired luminescence for the desired lighting level is obtained.

17. The apparatus of claim 13, wherein the logic controller is operable to calculate the intensity values for color components of the content portion of the video display screen and to compare the calculated color component intensity values with predetermined desired color component intensity values for the whole of the video display screen and adjust the signal so that the color components of the light portion of the video display screen will produce a combination of color with intensity values which are supplemental to that which is produced by the content portion of the video display screen to achieve the desired color component intensity values for the desired lighting level for the whole of the video display screen.

18. The apparatus of claim 13, wherein the logic controller is operable to adjust the video signal so that secondary content will be displayed on the light portion of the video display screen while keeping the auxiliary lighting level as required.

19. A method comprising:

recording video of a subject adjacent a video display screen with a video camera;

apportioning the video display screen into a content portion which displays video content and at least one light portion which provides variable auxiliary lighting when energized;

measuring the lighting level adjacent the video display screen with the video camera;

dynamically adjusting the luminescence and color of the auxiliary lighting emitted from the light portion of the video display screen so that the lighting level adjacent the video display screen strives towards a predetermined desired lighting level, wherein the dynamically adjusted auxiliary lighting is provided as long as the video display screen displays the video content; and transmitting the video via a communications network.

* * * * *